United States Patent
Matsumoto et al.

(10) Patent No.: US 6,647,125 B2
(45) Date of Patent: Nov. 11, 2003

(54) IMAGE PROCESSING APPARATUS, METHOD AND RECORDING MEDIUM THEREFOR

(75) Inventors: Kentaro Matsumoto, Higashi Kurume (JP); Hirokazu Uchio, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,497

(22) Filed: Jul. 16, 1998

(65) Prior Publication Data

US 2003/0123696 A1 Jul. 3, 2003

(30) Foreign Application Priority Data

| Jul. 17, 1997 | (JP) | 9-192364 |
| Jul. 17, 1997 | (JP) | 9-192365 |
| Sep. 16, 1997 | (JP) | 9-250504 |

(51) Int. Cl.$^7$ .................................................. G06K 9/00
(52) U.S. Cl. ........................................ 382/100; 382/299
(58) Field of Search ................................ 382/305, 232, 382/100, 240, 299; 380/3, 4, 217, 54, 200; 235/494, 460; 358/3.28; 283/113.72

(56) References Cited

U.S. PATENT DOCUMENTS

| 5,038,298 A | | 8/1991 | Matsumoto et al. ........ 364/518 |
| 5,157,773 A | | 10/1992 | Matrumoto et al. ........ 395/375 |
| 5,245,165 A | * | 9/1993 | Zhang ........................ 235/454 |
| 5,278,400 A | * | 1/1994 | Appel ........................ 235/494 |
| 5,369,261 A | * | 11/1994 | Shamir ....................... 235/469 |
| 5,568,550 A | | 10/1996 | Ur ................................ 380/3 |
| 5,710,834 A | * | 1/1998 | Rhoads ....................... 382/232 |
| 5,832,126 A | * | 11/1998 | Tanaka ....................... 382/239 |
| 5,905,819 A | * | 5/1999 | Daly ........................... 382/284 |
| 5,915,027 A | * | 6/1999 | Cox et al. ..................... 380/54 |
| 5,983,176 A | * | 11/1999 | Hoffert et al. ............... 704/233 |
| 6,049,627 A | * | 4/2000 | Becker et al. .............. 382/181 |
| 6,072,888 A | * | 6/2000 | Powell et al. ............... 382/100 |
| 6,092,732 A | * | 7/2000 | Curry ......................... 235/494 |
| 6,163,842 A | * | 12/2000 | Barton ........................ 713/176 |
| 6,285,458 B1 | * | 9/2001 | Yada ......................... 358/1.15 |
| 6,496,591 B1 | * | 12/2002 | Rhoads ....................... 382/100 |

FOREIGN PATENT DOCUMENTS

| EP | 0581317 A2 | 2/1994 | ............ G07D/7/00 |
| EP | 0590884 A2 | 4/1994 | ............ H04N/1/00 |
| JP | 05-244389 | 9/1993 | ........... H04N/1/387 |

* cited by examiner

Primary Examiner—Yon J. Couso
(74) Attorney, Agent, or Firm—Fitzpatrick, Cella, Harper & Scinto

(57) ABSTRACT

An image processing apparatus comprising a divider for dividing an input image into plural areas, a controller for controlling a storage format of image data representing the input image in a unit of a divided area, a converter for converting the image data into the storage format, and an adder for adding predetermined information to the input image in the unit of the area. The controlling performed by the controller includes controlling whether or not the image data is compressed.

8 Claims, 20 Drawing Sheets

IMAGE PROCESSING APPARATUS, METHOD AND RECORDING MEDIUM THEREFOR

BACKGROUND OF THE INVENTION

1. Field of the Invention

The present invention relates to an image processing apparatus for adding predetermined information to an input image, and a method and a storage medium therefor.

2. Related Background Art

There is conventionally known a technology for adding, to an input image, the manufacturing number of a copying apparatus which is used for processing such image, as disclosed for example in the Japanese Patent Laid-open Application No. 5-244389. Such technology is effective in tracing the origin of the image from a reproduced image.

On the other hand, there have recently been proposed various memory formats for storing image information.

In such memory formats, however, there has not sufficiently been considered a method of adding certain information in a manner inconspicuous or invisible to the human eyes. For this reason, it has not been possible, for example in case of storing plural image data files of mutually different resolution levels representing a same input image, to add the information associated with the image data in a suitable method.

Also it has not been possible, for example in case of dividing the input image into plural areas and storing the image information in the unit of such divided area, to add the information associated with the image information in a suitable method.

Also in the conventional formats for image storage, in case of adding certain information in a manner inconspicuous or invisible to the human eyes, there has not sufficiently been considered the data format to be taken for the image including such added information. For this reason, the added information may be deteriorated or may become unreproducible for example by the influence of subsequent data compression.

SUMMARY OF THE INVENTION

An object of the present invention is to provide an image processing apparatus, a method and a storage medium therefor, capable of individually or entirely solving the drawbacks mentioned in the foregoing.

Another object of the present invention is, under the above-mentioned object, to enable, in storing image information with a predetermined image storage format, the addition of predetermined information to the input image with a method suitable for such storage format.

Still another object of the present invention is, under the above-mentioned object, to enable, in adding predetermined information to the input image, the storage of image taking such addition of information into consideration.

The above-mentioned objects can be attained, according to a preferred embodiment of the present invention, by an image processing apparatus comprising:

a division unit for dividing an input image into plural areas;

a selection unit for selecting the storage format of the image data representing the input image in the unit of each of the divided areas;

conversion means for converting the image data into the above-mentioned storage format; and addition means for adding predetermined information to the input image in the unit of each of the divided areas.

Still another object of the present invention is to provide an image processing apparatus, a method and a storage medium therefor, having a novel function or a novel mode of adding information to the given image information.

Still other objects of the present invention, and the features thereof, will become fully apparent from the following description of embodiments to be taken in conjunction with the attached drawings.

DESCRIPTION OF THE PREFERRED EMBODIMENTS

Now the present invention will be clarified in detail by preferred embodiments thereof, with reference to the attached drawings.

At first there will be given an explanation on the storage format.

1. File structure (1) The storage format of the present embodiment is composed of objects of two types, namely a directory (shaded in FIG. 1) and a file (non-shaded).

Figure 1:
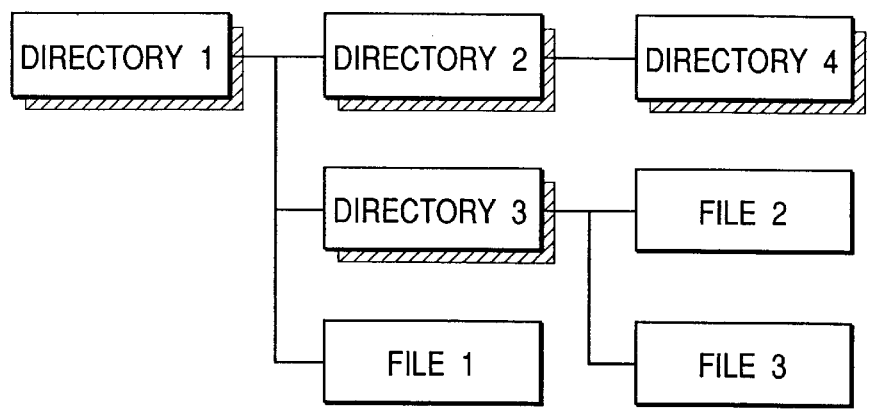
FIG. 1 is a view showing the storage format embodying the present invention.

In an example shown in FIG. 1, a directory 1 constitutes a root directory, constituting the highest hierarchy in the storage format. The directory 1 includes two directories (directories 2, 3) and a file (file 1). The directory 2 includes an empty directory 4, and the directory 3 includes two files (files 2, 3).

The image information and the image attribute information are stored in a structure constituted by the above-mentioned two objects.

(2) Configuration of image file

Figure 2:
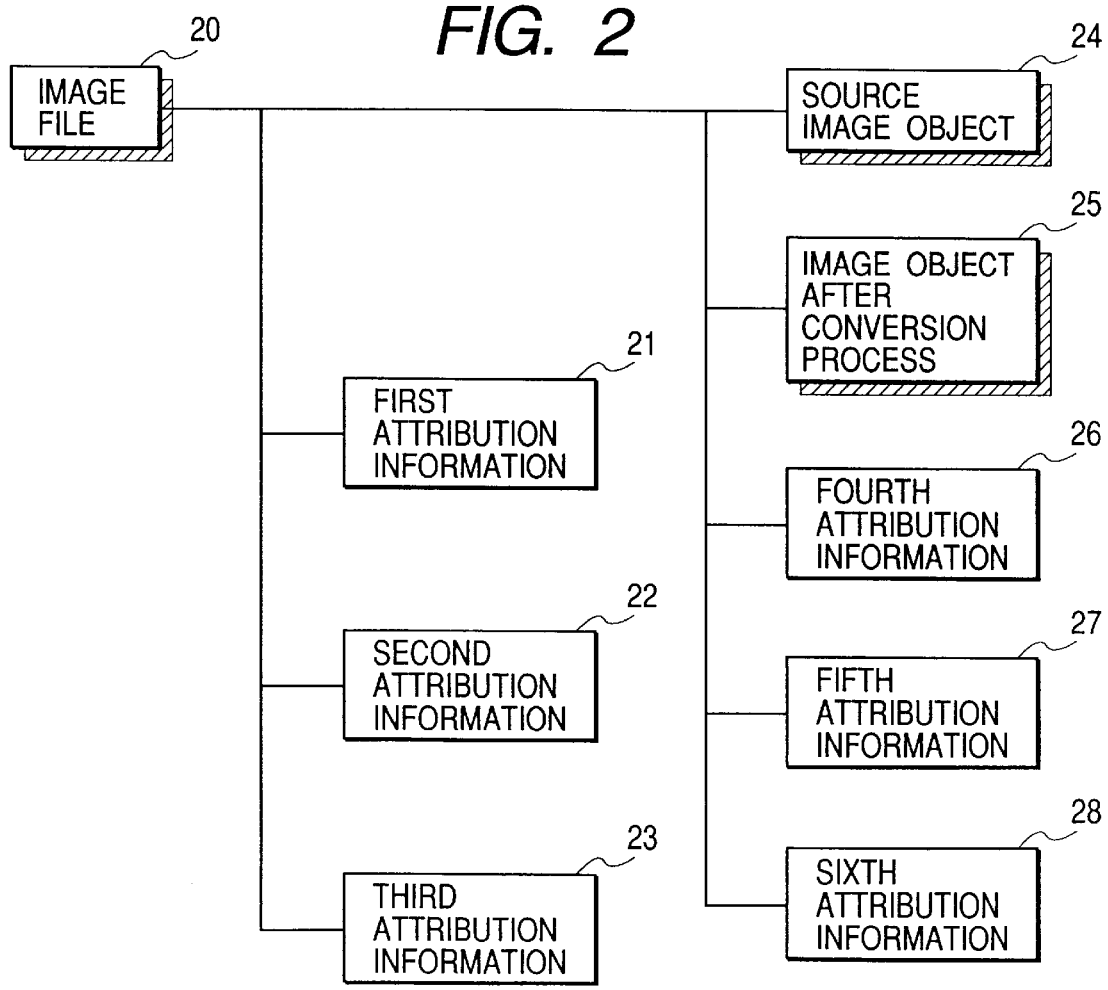
FIGS. 2 and 3 are views showing the configuration of an image file in the storage format embodying the present invention.
Figure 3:
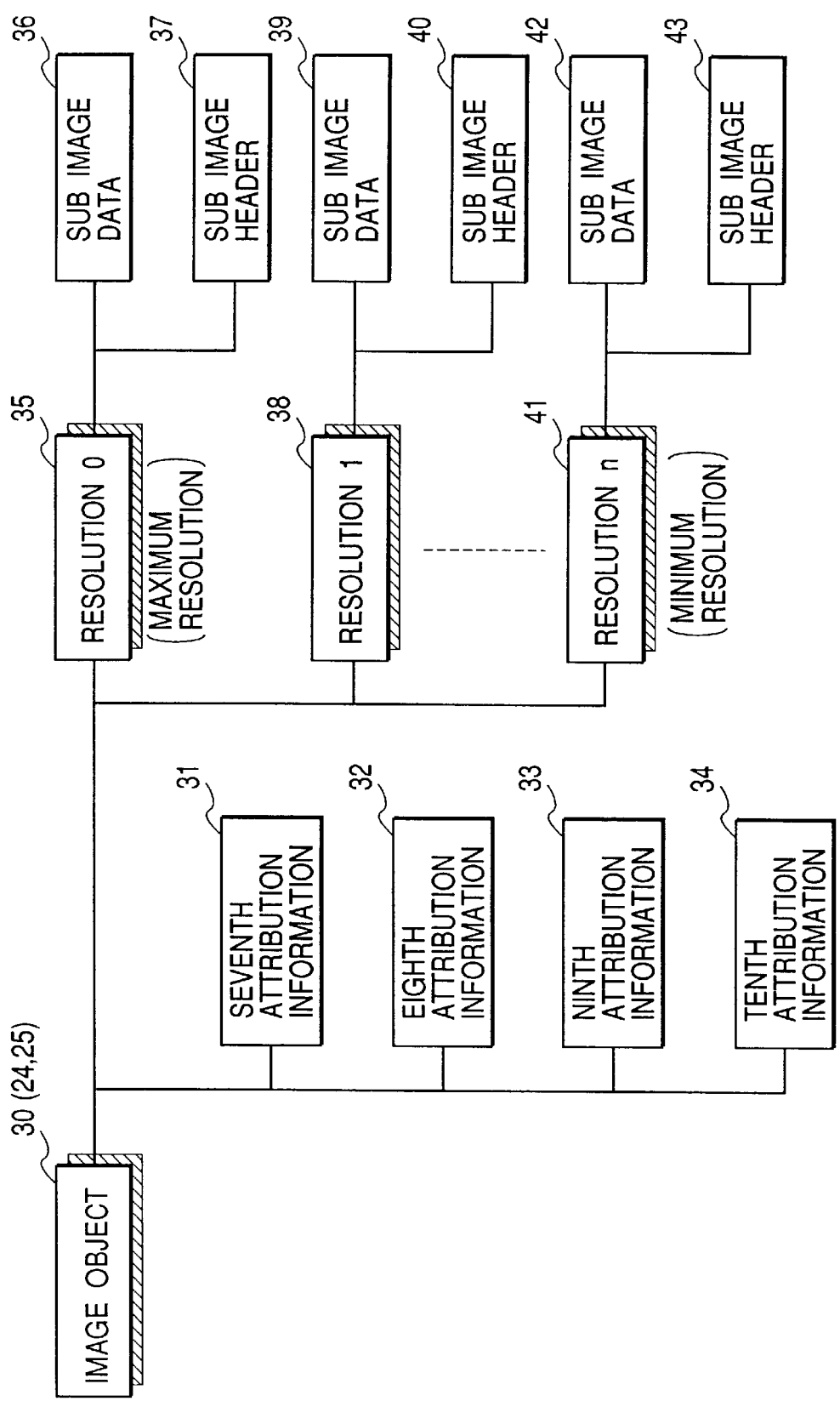

As shown in FIG. 2, each image file (20) contains following components:

(a) first attribute information (21)

Summary information of the object image, including the format ID, title, producer, keyword, comment, final owner, revision number (number of times of savings of the object), total editing time, date and time of final print, date and time of original preparation, date and time of final storage, thumbnail attribute, and application used for preparation;

(b) second attribute information (22)

General information on the object of storage, including the heater, user type, clipboard format etc.;

(c) third attribute information (23)

Information on the output image including the list of locked properties, image title after conversion, final editor, output image index, largest image index, largest conversion item index, largest operation index etc.;

(d) Source image object (24)

It consists of image information of the source image and attribute information thereof, as will be explained later;

(e) Image object after conversion (25)

It consists of image information and attribute information, obtained by applying a predetermined conversion process to the source image, and is structured similar to the source image object;

(f) fourth attribute information (26)

Additional information of the original image or the image after conversion, including, on the source image object or on the converted image object, at least one or more of the image ID, list of locked properties, title, final editor, revision number, date and time of preparation, date and time of final correction, application used in preparation, status, number of conversions, list of conversion processes, height/width of the contained image etc.;

(g) fifth attribute information (27)

Attribute information on the conversion of the source image information, including at least one or more of the conversion item ID, operation class ID, list of locked properties, conversion title, final corrector, revision number, date and time of preparation, date and time of final correction, application used for preparation, input data list, output data list, operation number, aspect ratio of process result, observed rectangular area, filtering geometric calculation, color conversion matrix, contrast adjustment etc.; and (h) sixth attribute information (28)

Information for specifying the software for executing the conversion.

(3) Configuration of image object (30)

The above-mentioned source image object (24) and converted image object (25) include following components:

(a) seventh attribute information (31)

Summary information of each object, including at least one or more of the format ID, title, producer, keyword, comment, final owner, revision number (number of times of savings of the object), total editing time, date and time of final print, date and time of original preparation, date and time of final storage, thumbnail image, thumbnail attribute, and application used for preparation;

(b) eighth attribute information (32)

General information on the object of storage, including the header, user type, clipboard format etc.;

(c) ninth attribute information (33)

Attribute information on the method of storage of the image information, including the number of resolutions of the object image, width and height of the image of the maximum resolution, default width and height of the image display, unit of width and height of the image display, width, height, color and format of the sub image, reducing method (method of preparation of the image of plural resolutions), width of the reduction prefilter, color processing profile of the sub image, compression parameters (quantization table data of Huffman table data SOI, DQT, DHT, HOI in the JPEG compression) etc.;

(d) tenth attribute information (34)

Information associated with the image information, including the file source (original device of image, scene type, image preparation history, software used for preparation, user defined ID, sharpness), intellectual property (copyright indication, original image ownership, digital image ownership, producer, remarks), content description information (proofing data in image, description on image group, description on the title or object of image, description on the person in the image, description on the object in the image, date of original image, description on the event in the image, description on the location in the image, remarks), information on the camera used for image taking (camera maker name, camera model, camera manufacturing number), information on the setting of the camera at image taking (date and time of image taking, shutter speed, diaphragm stop, exposure program, luminance value (BV value), exposure correction, image taking distance, light metering mode, light source, focal length, fully open aperture value, flash, guide number, flush confirmation, backlighting, position of object, frame number, special effect filter, remarks), digital camera characteristics (kind of image sensor, X-resolution on the focal plane, Y-resolution on the focal plane, unit of resolution on the focal plane, spatial frequency characteristics, color filter array pattern, spectral sensitivity, ISO speed rating, OECF), film information (film brand, film category, film size, film roll number, film frame number), descriptive information on original document scanning in case the original is a book or a printed matter (original scanning image size, original document size, original medium, kind of original), scanning device information (scanner maker, scanner model, manufacturing number, scanner software, scanner software version number, scanning service company name, scanning person ID, scanning date, date and time of final proofing, scanner pixel size) etc., namely the information usable at the use of image such as how the image has been fetched and how the image can be utilized.

(e) Image information

It is composed, for a same image, image data (sub image data) 36, 39, 42 of plural resolution levels (35, 38, 41) and headers 37, 40, 43 of the sub image data of respective resolution levels.

Instead of having the images of plural resolution levels, the file may also be composed of the image data of maximum resolution and the header thereof.

The headers 37, 40, 43 contain the length of header stream, width and height of the image, number of tiles to be explained later, width and height of tile, number of channels, offset of tile header table, length of tile header entry, tile header table (consisting of tile offset, tile size, compression type and compression sub title).

The tile offset indicates the position of the tile, while the time size indicates the amount of data in the tile, the compression type indicates whether the tile data are non-compressed image data, a single color, JPEG compressed image data or lack effective image data, and the compression sub type indicates the color in case of single-color data, or the interleaving type, chroma sub sampling method, presence/absence of internal color conversion and presence/absence of change in the JPEG table in case of JPEG compression.

Figure 4:
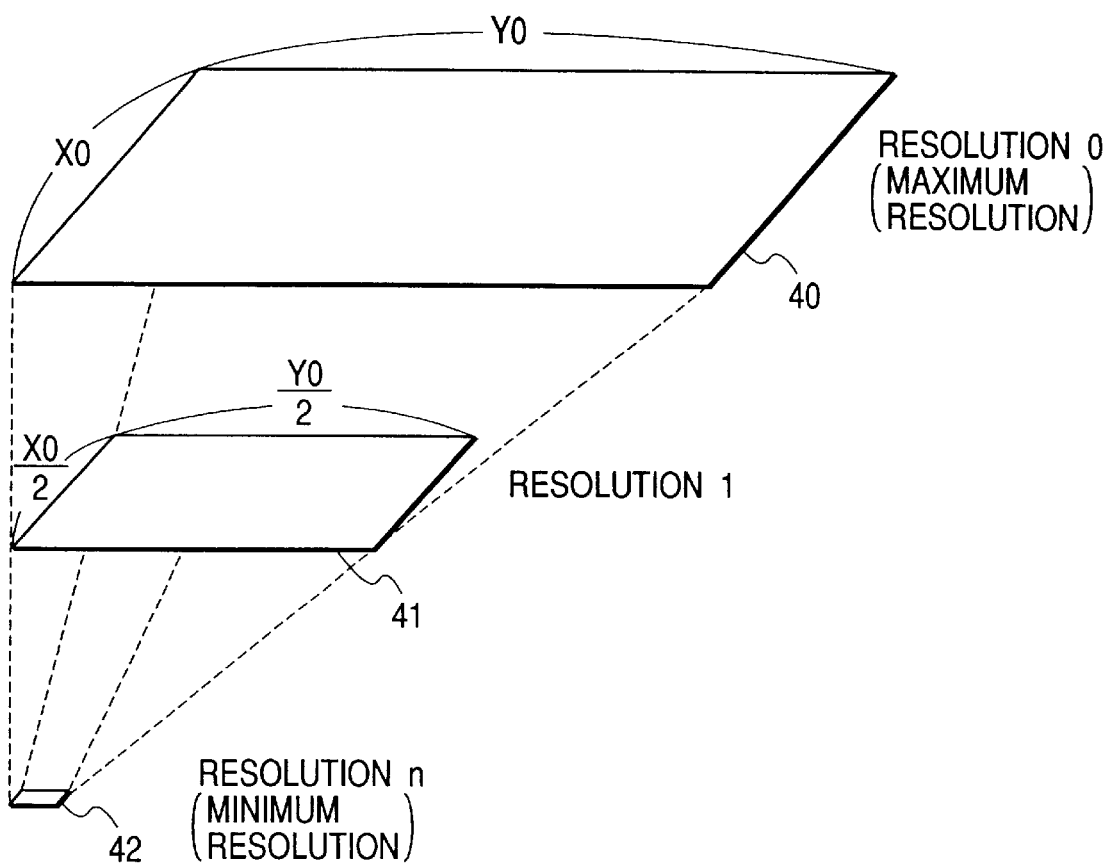
FIG. 4 is a view showing an example of the image file composed of plural images of different resolution levels.

FIG. 4 shows an example of the image file consisting of plural images of different resolution levels. In FIG. 4, an image 40 of the maximum resolution is composed of X0 columns and Y0 rows, while an image 41 of the second largest resolution is composed of X0/2 columns×Y0/2 rows. Thereafter the numbers of columns and rows are both reduced to ½ in succession until those of columns and rows become respectively equal to or less than M and N, and the images are memorized down to an image 42 of the minimum resolution.

Because of such hierarchic structure, there are required "number of hierarchic layers in an image file" in the attribute information of the image, and the header information and the image information for the image in each hierarchic layer. The information on the number of hierarchic layers in an image filed, the width and height of the image of maximum resolution, the width, height, color configuration, compression method etc. of the image of each resolution are described as the aforementioned first attribute information 21.

Figure 5:
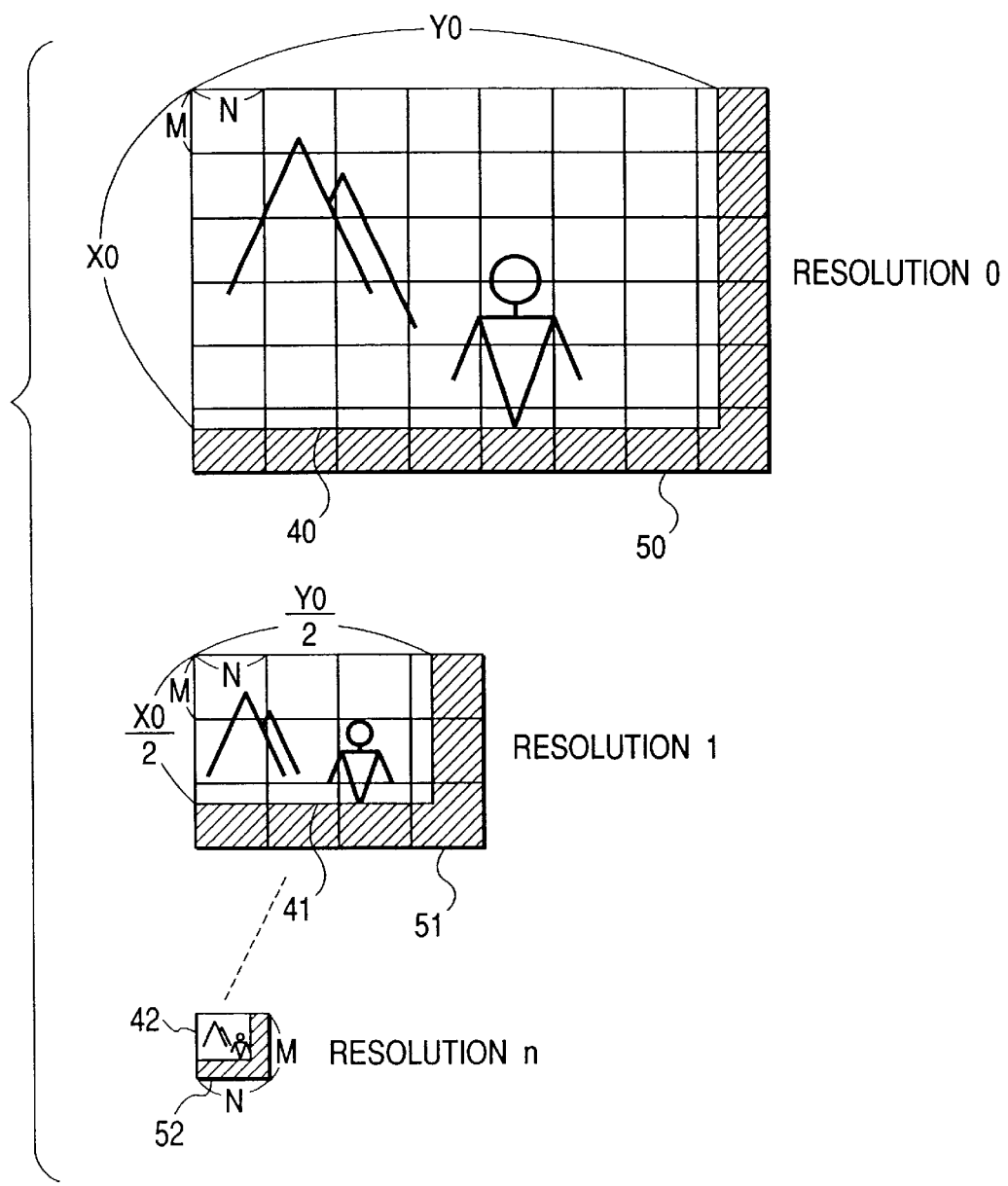
FIG. 5 is a view showing an example of tile division.

As shown in FIG. 5, the image of each resolution layer is divided into tiles each consisting of M×N pixels. When the image is divided into the tiles of M×N pixels starting from the upper left corner, a blank portion may be generated in a part of the tiles at the right-hand end and/or at the lower end (indicated by a hatched area).

In such case the tile of M×N pixels is completed by inserting the pixel at the right-hand end or at the lower end repeatedly.

The image of each tile is memorized in a data format of JPEG compression, single color or non compression. The JPEG compression is an image compressing method of international standard defined by ISO/IEC JTC1/SC29. The single color is a data format, in case an entire tile is substantially composed of a single color, of representing the color of the tile by a single color instead of memorizing the individual pixel values. This data format is effective particularly for an image generated by computer graphics.

The image data divided into the tile as explained in the foregoing are stored in the sub image data file, and the total number of tiles, the size of each tile, the data start position, the data format etc. are stored in the sub image header.

Figure 6:
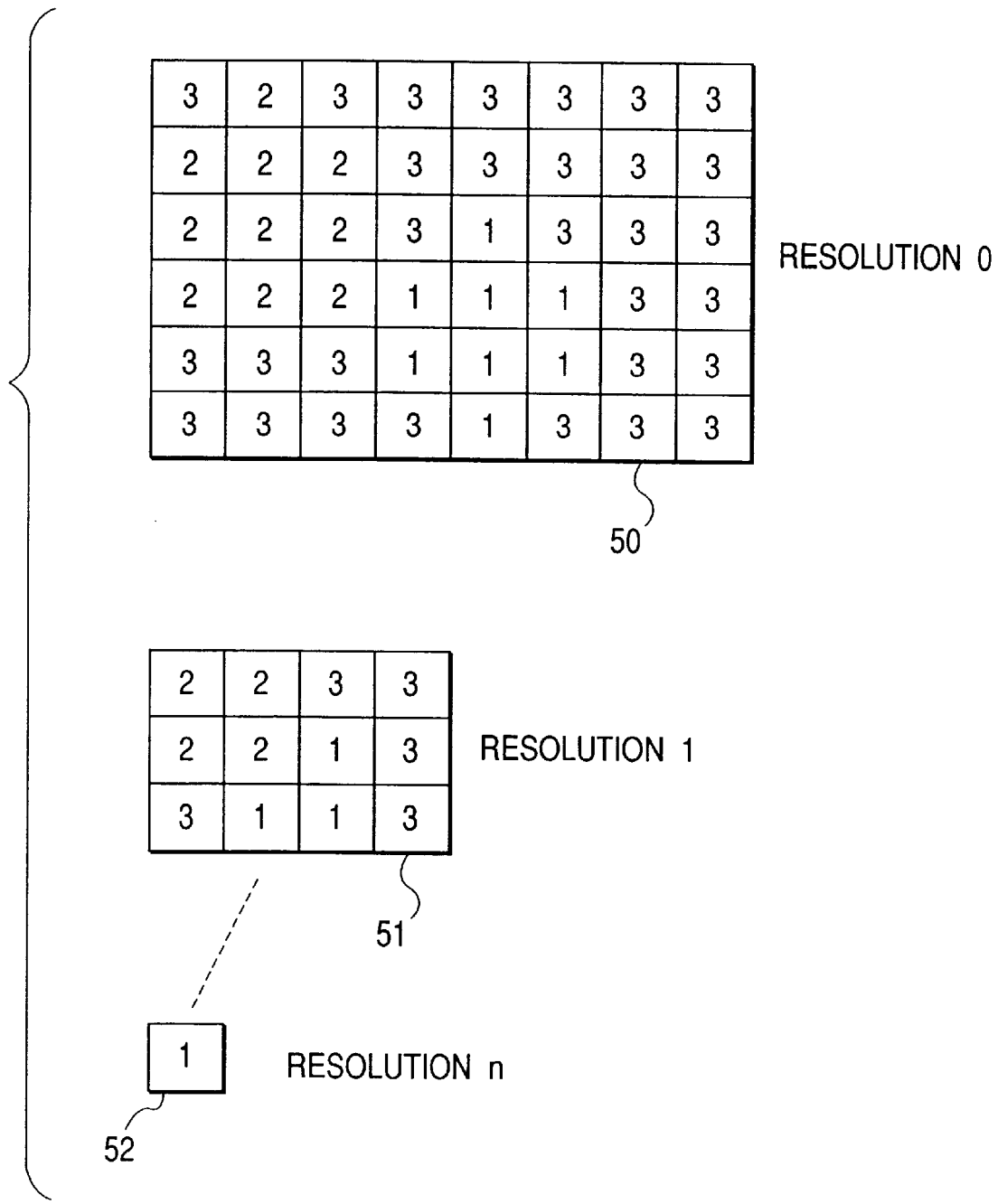
FIG. 6 is a view showing an example of distribution of data formats in the tiles after tile division of the image.

FIG. 6 shows an example of the distribution of data formats of the tiles when the images 40, 41, 42 in FIG. 5 are divided into tile images 50, 51, 52. In FIG. 6, the attribute 1 indicates a non-compressed image, the attribute 2 indicates a JPEG compressed image and the attribute 3 indicates a single color.

Once the attribute is determined for each tile of the image of a resolution level 0, the attribute of each of the images of the resolution levels 1 to n can be easily determined according to a predetermined rule.

For example, in case all of the four tiles of the resolution level 0, corresponding to a tile of the resolution level 1, have the attribute 1 (non-compressed image), such tile can be defined to have the attribute 1. Also if all the four tiles have the attribute 3 (single color), the tile of the resolution level 1 can be defined to have the attribute 3. In case any of the four tiles has the attribute 2, the tile of the resolution level 1 can be defined to have the attribute 2, and, if the four tiles have the attributes 1 and 3, the tile of the resolution level 1 can be defined to have the attribute 1.

2. Hardware Configuration

Figure 7:
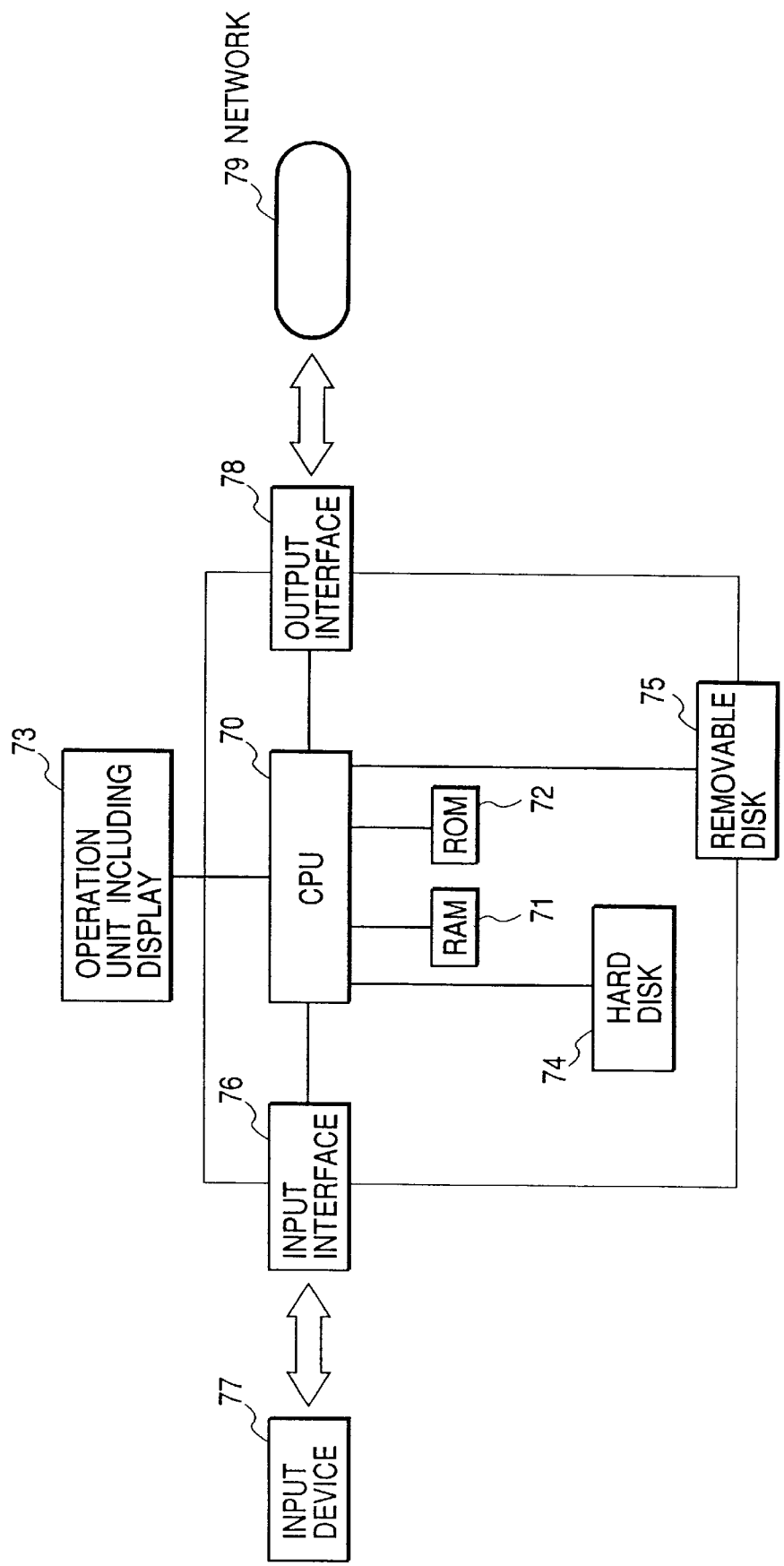
FIG. 7 is a view showing an example of the hardware configuration embodying the present invention.

An example of the hardware configuration in the present embodiment is shown in FIG. 7.

There are shown a CPU 70 for executing the process sequence to be explained later; a RAM 71 used for example as a work area for the CPU 70; a ROM 72 storing the programs to be executed by the CPU; an operation unit 73 including a display unit and used as a user interface; a hard disk 74 for storing data of the above-described data formats; a removable disk 75 such as a CD-R, a DVD-RAM or a floppy disk for storing data of the above-described data formats; an input interface 76 consisting of a bidirectional interface for entering image information and other information from an input device 77 such as an image scanner, a digital camera, a digital video camera or the like; and an output interface 78 consisting of a bidirectional interface for outputting information to an external device through communication means such as a network 79.

3. Preparation of image file

Now there will be explained an example of the procedure for preparing the image file described above.

Figure 8:
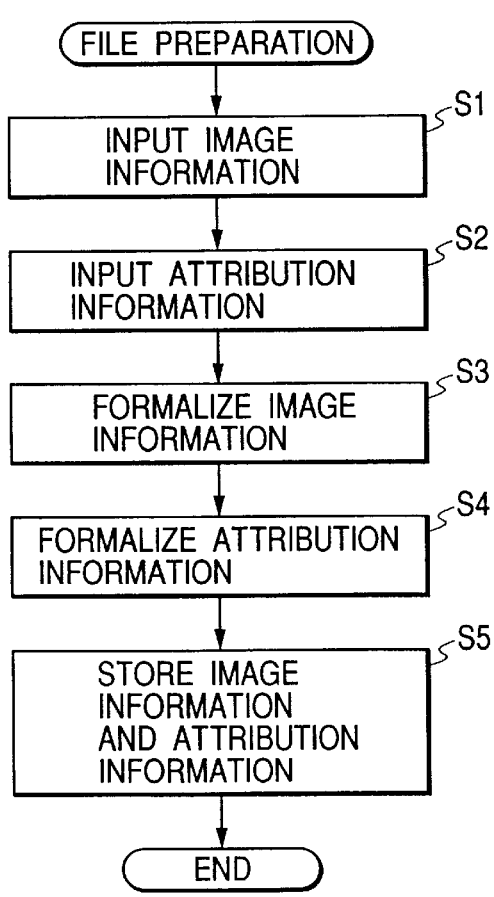
FIG. 8 is a flow chart showing the procedure of file preparation.

FIG. 8 shows the basic procedure executed by the CPU shown in FIG. 7.

A step S1 enters the image information from the input device 77 such as an image scanner, a digital camera or a digital video camera through the input interface 76.

A step S2 enters information associated with the image information and constituting the basis of the first to tenth attribute information described above. The entry is executed manually through the input interface 76 or the operation unit 73.

A step S3 formats the image information, entered in the step S1, into the image file format of the above-described structure.

A step S4 formats the attribute information, entered in the step S2, into the image file format of the above-described structure.

A step S5 stores the formatted image and attribute information in the hard disk 74 or the removable disk 75.

In the following there will be explained, with reference to FIG. 9, the formatting procedure of the image information in the step S3 in FIG. 8.

A step S10 develops the entered image information into image data of respective pixels. The image data of respective pixels are prepared by an expansion process in case the image information is entered in a compressed format such as JPEG compression, or a development process in case of entry in the PDL codes. Also in case the size of the entered image information has to be changed, the size conversion is achieved by trimming or zooming. This step is skipped if these processes are unnecessary.

If the color space of the pixel data needs to be converted, a step S20 executes a color space conversion into any of predetermined color spaces such as RGB (additive primary colors) space and YCC (luminance and chromaticity) space.

A step S30 executes formatting for the image of maximum resolution, namely resolution level 0, as will be explained later in more details. The subsequent steps are not executed in case the image information is formatted only in the maximum resolution level.

A step S40 reduces the resolution to a half. The method of reduction is formatted as the ninth attribute described above.

A step S50 executes formatting for thus prepared image of the resolution level 1.

A step S60 executes a reduction process similar to that in the step S40.

The reduction and the formatting are thereafter repeated in a similar manner, and a step S70 terminates the process by executing the formatting for the image of the resolution level n.

In the following there will be explained, with reference to FIG. 10, the procedure of development into the pixel data, in the step S10 in FIG. 9.

A step S110 discriminates whether the entered image information is non-compressed pixel data, and the sequence jumps to a step S170 if the entered image information is non-compressed pixel data and does not require the development process.

A step S120 discriminates whether the entered image information is encoded data, and, if so, a step S140 executes decoding.

A step S130 discriminates whether the entered image information is command data such as PDL, and, if so, a step S150 executes development of the command.

If the entered image information is data of any other format and requires a process matching such format, a step S160 executes such process.

A step S170 adjust the number of bits per pixel and the image size.

Figure 11:
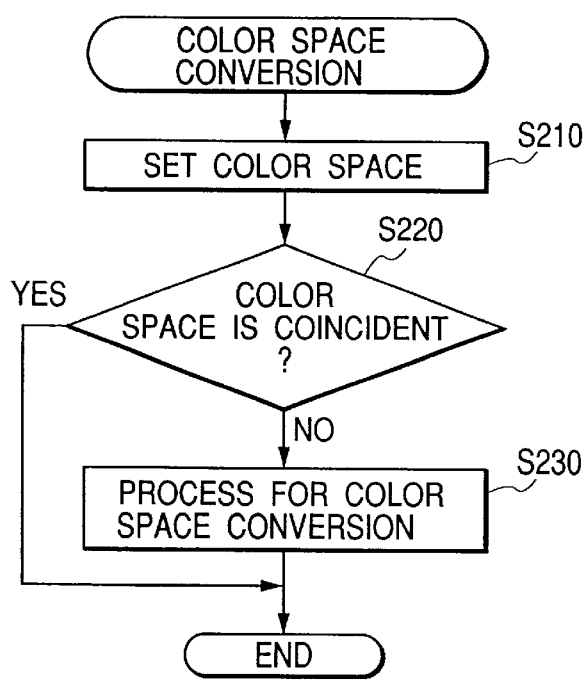
FIG. 11 is a flow chart showing the procedure of color space conversion.

In the following there will be explained, with reference to FIG. 11, the procedure of color space conversion in the step S20 in FIG. 9.

A step S210 presets a color space in manual manner through the operation unit 73.

A step S220 discriminates whether the color space of the entered image information coincides with the color space set in the step S210, and, in case of no coincidence, a step S230 executes the conversion of the color space.

In the following there will be explained, with reference to FIG. 12, the procedure for the image of the resolution level 0 in the step S20 in FIG. 9.

A step S310 divides the image into tiles, each of M×N pixels.

A step S320 detects the attribute of the image of each of the divided tiles. For example a tile containing a character or a fine line is defined as a character/fine line tile; a tile containing relatively important information such as a human face is defined as an important tile; a tile of which all pixels are of same data (or if only a very limited number of pixels is different in value) is defined as a single color tile; and any other tile is defined as a halftone tile.

A step S330 determines the data format of the tile according to the detected attribute. For example, the character/fine line tile and the important tile mentioned above are determined as the non-compression of the attribute 1, the halftone tile is determined as the JPEG compression of the attribute 2, and the single color tile is determined as the single color of the attribute 3.

A step S340 processes the image data of each tile so as to attain the determined data format.

The foregoing procedure is basically applicable, in a similar manner, to the formatting of the images of the resolution level 1 to n.

Figure 13:
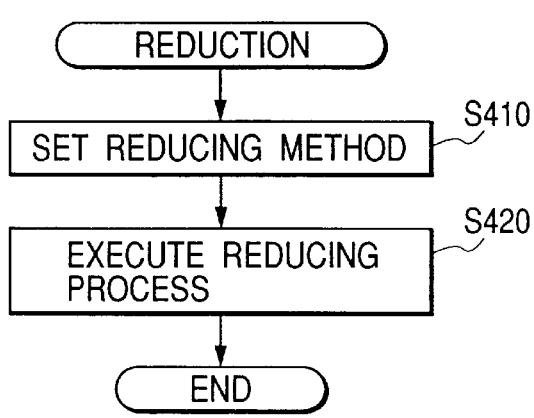
FIG. 13 is a flow chart showing the procedure of a reduction process.

In the following there will be explained, with reference to FIG. 13, the procedure of reduction in the step S40 in FIG. 9.

A step S410 presets the reduction method in manual manner through the operation unit 73.

A step S420 executes reduction on the image data of the original resolution, by thus set reduction method.

4. Insertion of watermark

Now there will be explained the method of adding a watermark to the image in the present embodiment.

The watermark means information related to the image information of the above-described image file and so added to the image information as to be invisible or inconspicuous to the human eyes. The first to tenth attribute information mentioned in the foregoing may be inserted as the watermark mentioned above.

An example of the method of inserting the watermark will be explained in the following.

Figure 14:
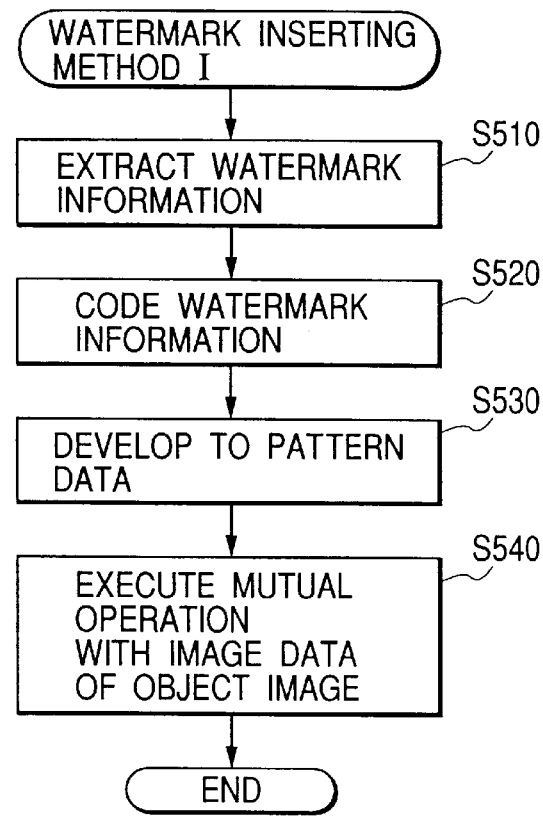
FIGS. 14 and 15 are flow charts showing the procedure of a watermark insertion process.

(1) FIG. 14 shows the procedure of a watermark inserting method 1, which inserts the watermark information into the object image in a real image space.

A step S510 selectively reads the attribute information of the above-described file format, stored in the hard disk 74 or the removable disk 75 such as a CD-R, a DVD-RAM or a floppy disk and usable as the watermark information.

A step S520 effects enciphering on the extracted watermark information, and such enciphering can be achieved in various methods, such as a known conversion utilizing a random number table. Also the present invention is not limited by the enciphering method.

A step S530 converts the enciphered watermark information, together with the pixels, into pattern data.

A step S540 utilizes the obtained image data of the watermark information for mutual calculation with the image data of the object image in the real image space, thereby embedding the watermark information in the object image.

The mutual calculation can for example an addition or a multiplication. In any calculation, the amplitude (dynamic range) of the watermark information is made sufficiently smaller than that of the object image, whereby the watermark information is added in inconspicuous manner to the human eyes.

Also the color component of the watermark information to be added is selected as the B component of the RGB (additive primary color) data or the chromaticity component of the YCC (luminance and chromaticity) data, so as that the deterioration in image quality is not easily recognized by the human eyes.

Figure 15:
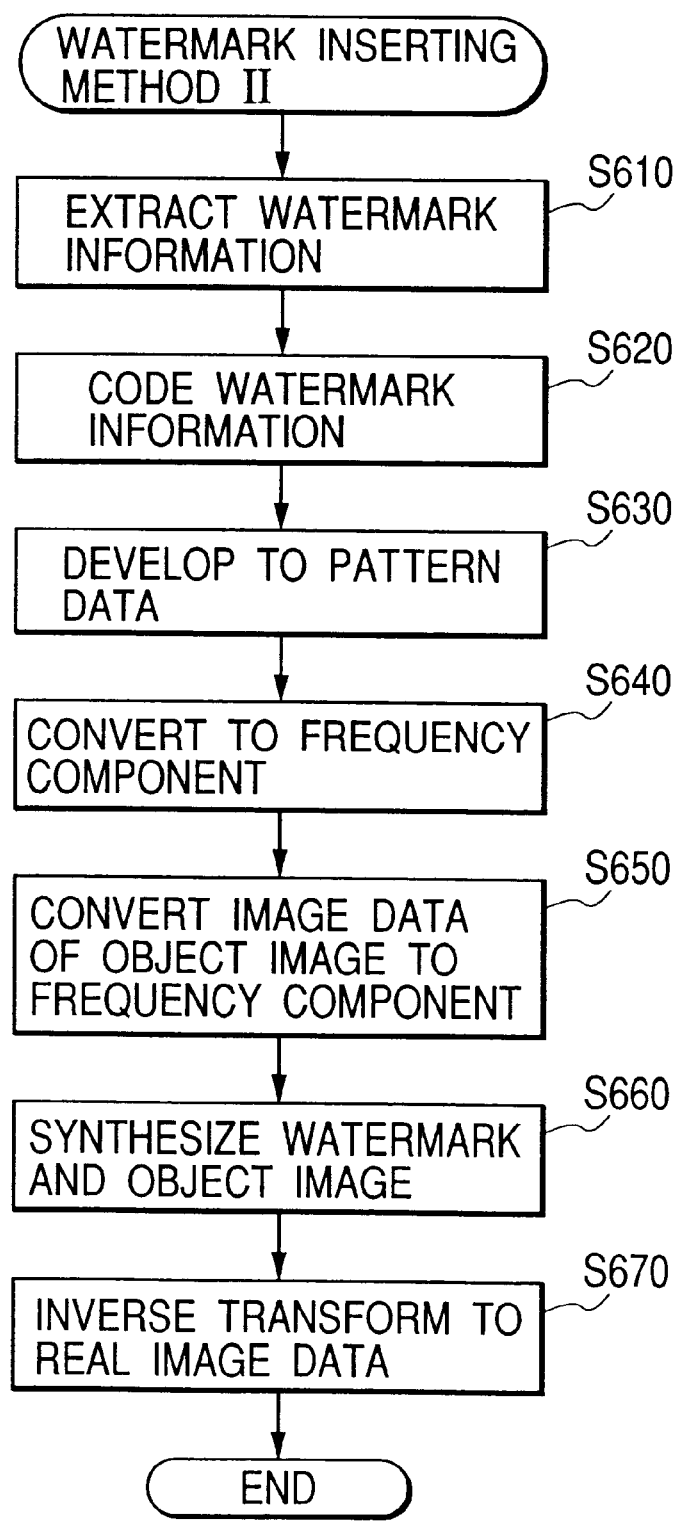

(2) FIG. 15 shows the procedure of a watermark inserting method II, which inserts the watermark information into the object image in the frequency space.

A step S610 selectively reads the attribute information of the above-described file format, stored in the hard disk 74 or the removable disk 75 such as a CD-R, a DVD-RAM or a floppy disk.

A step S620 effects enciphering on the extracted watermark information, and such enciphering can be achieved in various methods, such as a known conversion utilizing a random number table.

A step S630 converts the enciphered watermark information, together with the pixels, into pattern data.

A step S640 converts the obtained image data of the watermark information into frequency components for example by orthogonal transformation.

A step S650 converts the image data of the object image into frequency components for example by orthogonal transformation.

A step S660 synthesizes the image data of the object image and the enciphered watermark information in the real image space, thereby embedding the watermark information into the object image.

A step S670 executes inverse conversion of the synthesized image into the real image data.

Figure 16:
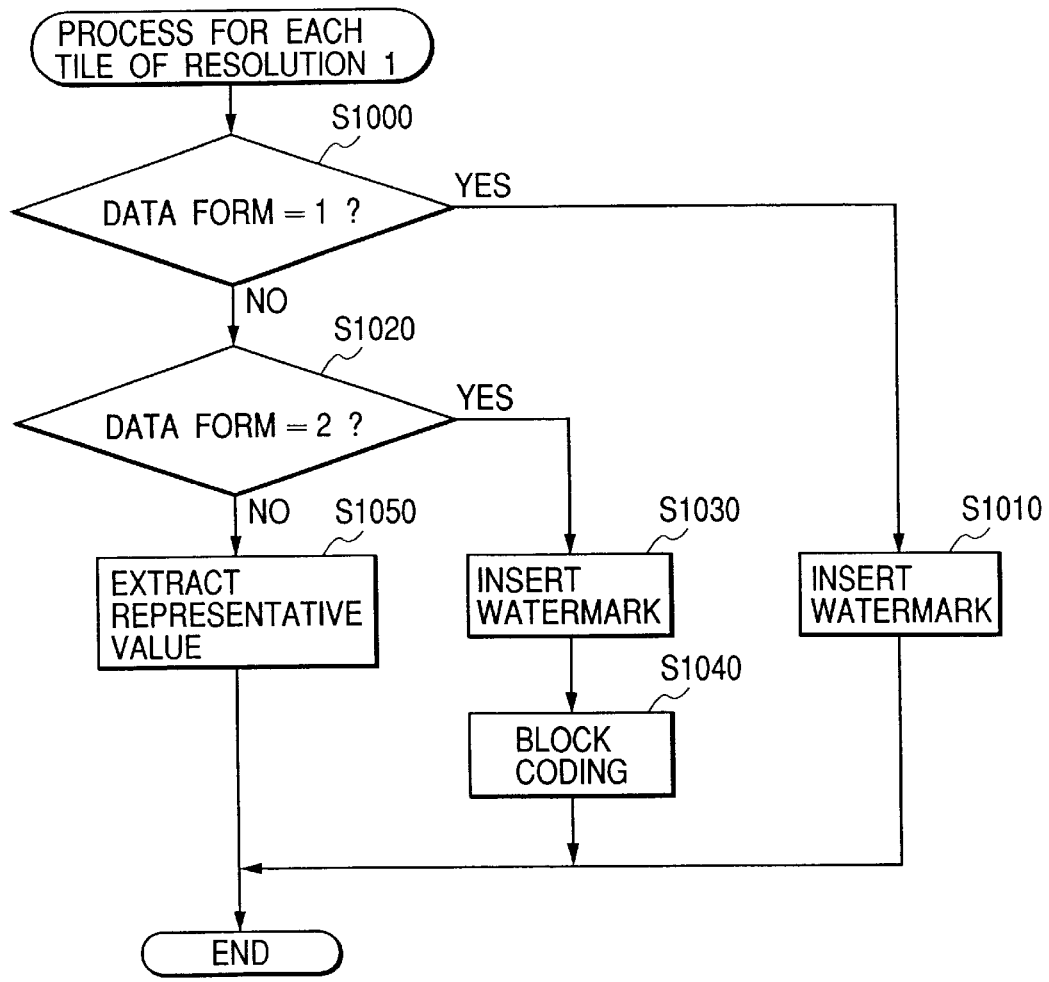
FIG. 16 is a flow chart showing the procedure of a process for each tile.

(3) There will be explained, with reference to FIG. 16, the procedure of above-explained watermark insertion into the image data of the resolution level 1.

Figure 12:
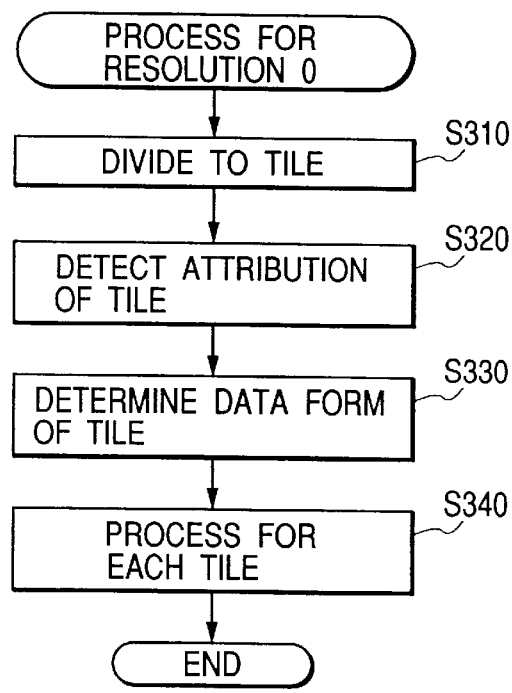
FIG. 12 is a flow chart showing the procedure of resolution level 0.

In the present embodiment, for inserting the watermark, the process for the image data of each tile, in the step S340 in FIG. 12, is conducted in the following manner.

A step S1000 discriminates whether the data format is in the attribute 1, and if so, a step S1010 inserts the watermark in the above-described method I.

A step S1020 discriminates whether the data format is in the attribute 2, and, if so, a step S1030 inserts the watermark in the above-described method II, and a step S1040 executes block encoding. If the block encoding is conducted by a method employing orthogonal transformation such as the JPEG encoding, the inverse conversion in the step S670 in FIG. 15 can be omitted and the frequency components can be directly subjected to quantization and Huffman encoding.

As explained in the foregoing, the watermark inserting method is selected according to the memory format of the image data, whereby the watermark can be inserted in a manner appropriate for each format.

In case the step S1020 identifies that the data format is not in the attribute 2, the tile is identified as in the attribute 3 and the representative value of the tile is extracted. In such case, the watermark is not inserted in the tile of this attribute.

The foregoing process is repeated for all the tiles.

The watermark is inserted with the content and the method same as in the foregoing, also for the images of the resolution levels 2 to (n−1).

Figure 17:
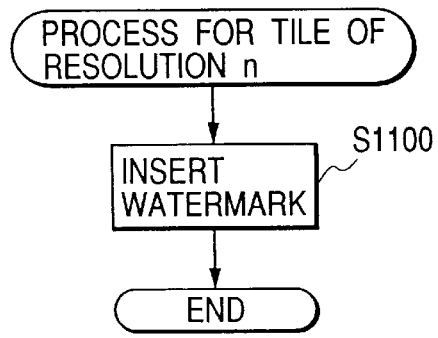
FIG. 17 is a flow chart showing the procedure of a resolution level 0 process.

On the other hand, for the image of the resolution level n, the watermark is inserted in a procedure shown in FIG. 17.

More specifically, as the image data of the resolution level n can have only one attribute, the watermark is inserted by the above-described method I.

As the watermark information is added in the present embodiment in the unit of a tile of M×N pixels, the watermark information is so selected that it is accommodated in a size of M×N pixels after enciphering and pattern development.

FIGS. 18 to 22 show examples of the content of the watermark information to be inserted and the arrangement thereof.

Example 1 of Watermark Insertion

Figure 18:
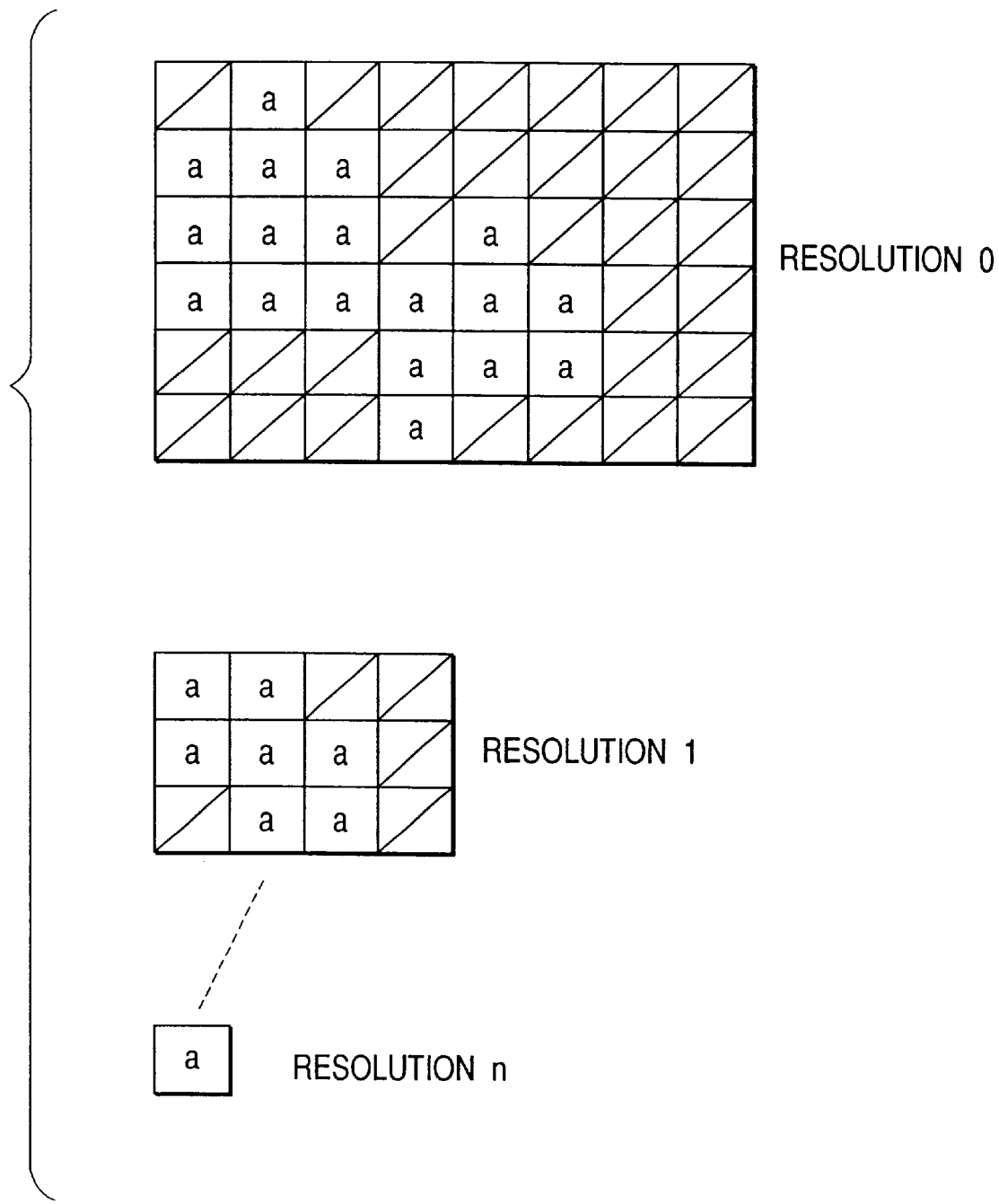
FIGS. 18, 19, 20, 21 and 22 are views showing examples of watermark insertion.

FIG. 18 shows an example of the tile as in FIG. 6, wherein a indicates the information to be inserted as the watermark. The content of the information a can be any or all of the aforementioned first to tenth attribute information, for example the name of producer of the original image and the date of preparation thereof.

In the example shown in FIG. 18, the information a is commonly inserted in the tiles of all the hierarchic layers.

In this example, as the common information is inserted in all the tiles of all the hierarchic layers, the name of the producer of the original image and the preparation date thereof can be obtained from the image of any layer so that the information source of the image data can be securely identified.

Example 2 of Watermark Insertion

Figure 19:
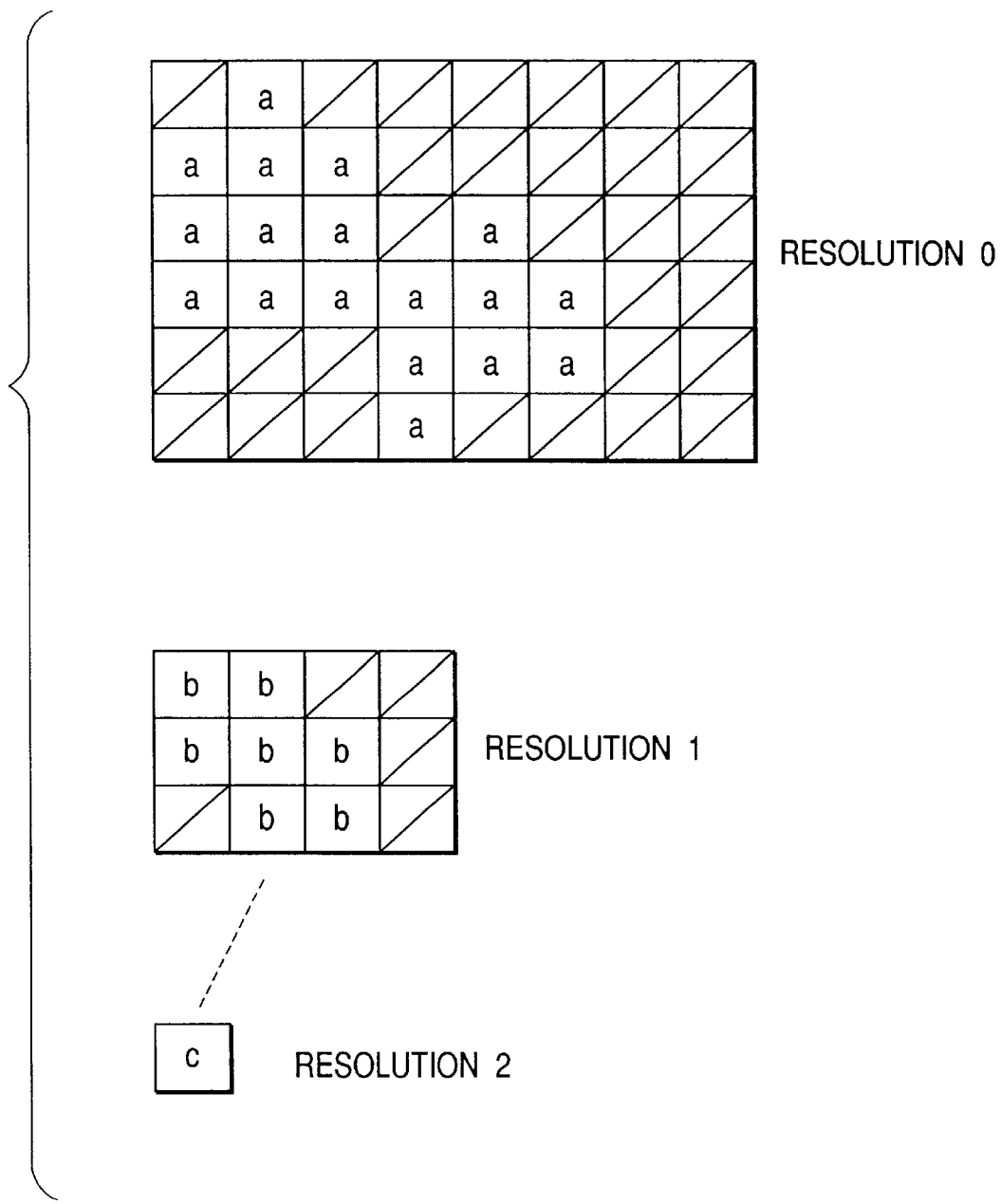

FIG. 19 shows an example of the watermark insertion as in FIG. 18.

In FIG. 19, a and b respectively indicate information to be inserted as the watermark. The content of the information a can be any or all of the aforementioned first to tenth attribute information, preferably a part thereof, for example the name of producer of the original image and the date of preparation thereof, while the content of the information b can be any or all of the aforementioned first to tenth attribute information, for example the name of the final storing person and the date and time of final storage.

In the example shown in FIG. 19, the insertion of the information a or b is switched according to the hierarchic layer.

Such arrangement allows to increase the kind and the amount of the information to be inserted, according to the increase in the number of hierarchic layers.

Example 3 of Watermark Insertion

Figure 20:
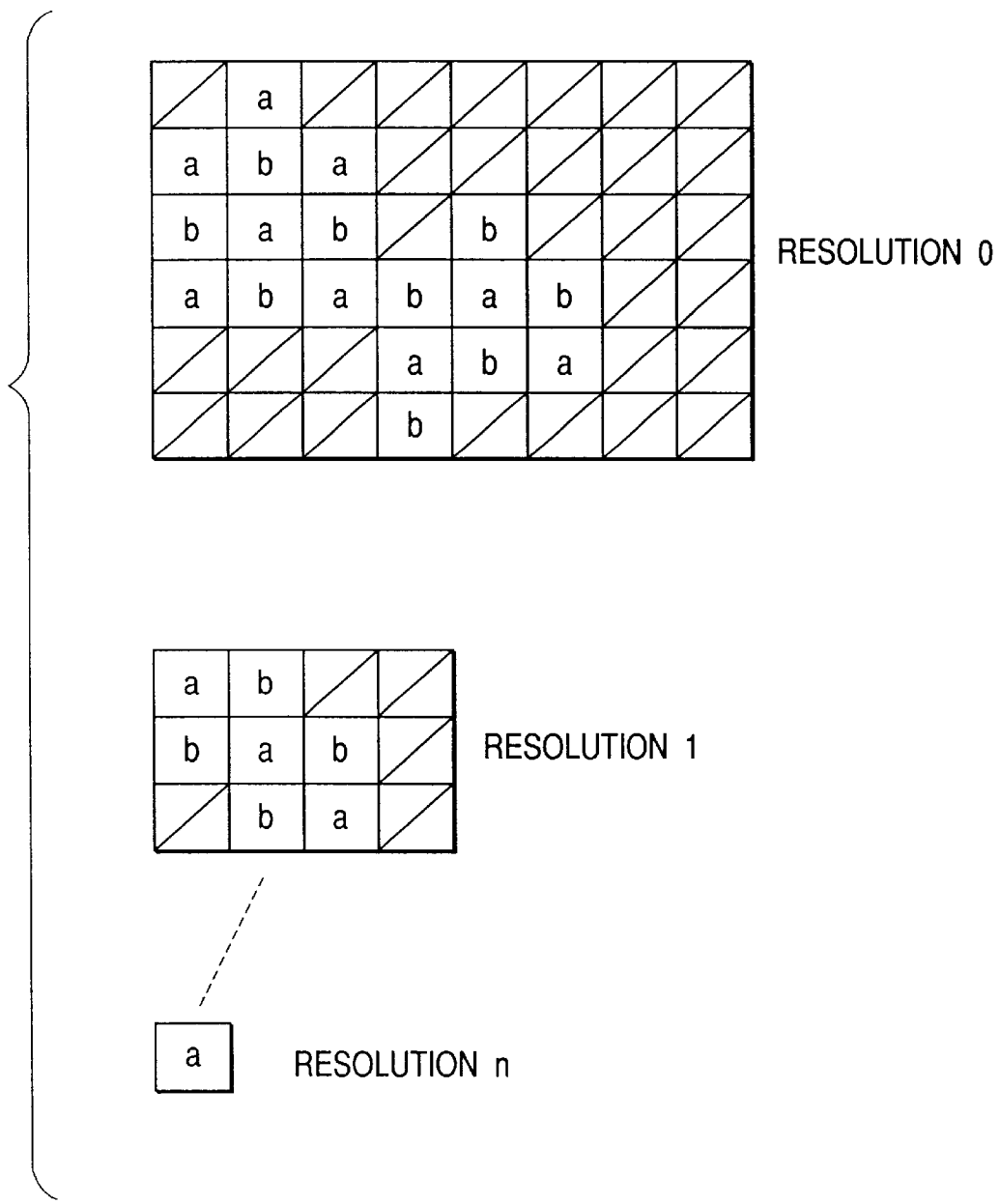

FIG. 20 shows an example of the watermark insertion as in FIG. 18.

In FIG. 20, a and b respectively indicate information to be inserted as the watermark. The content of the information a can be selected among the aforementioned first to tenth attribute information, for example the name of producer of the original image and the date of preparation thereof, while the content of the information b can be, among the aforementioned first to tenth attribute information, for example the name of the final storing person and the date and time of final storage.

In the example shown in FIG. 20, the information a and b are switched according to the tile position within the same hierarchic layer. The information a and b are alternately inserted in such a manner that same information is not present in mutually adjacent tiles.

Such arrangement of switching the information a and b according to the tile position within the same hierarchic layer allows to increase the kind and the amount of the information to be inserted, for a same number of the hierarchic layers, and to obtain the information of plural kinds from the images of mutually adjacent plural tiles.

Example 4 of Watermark Insertion

Figure 21:
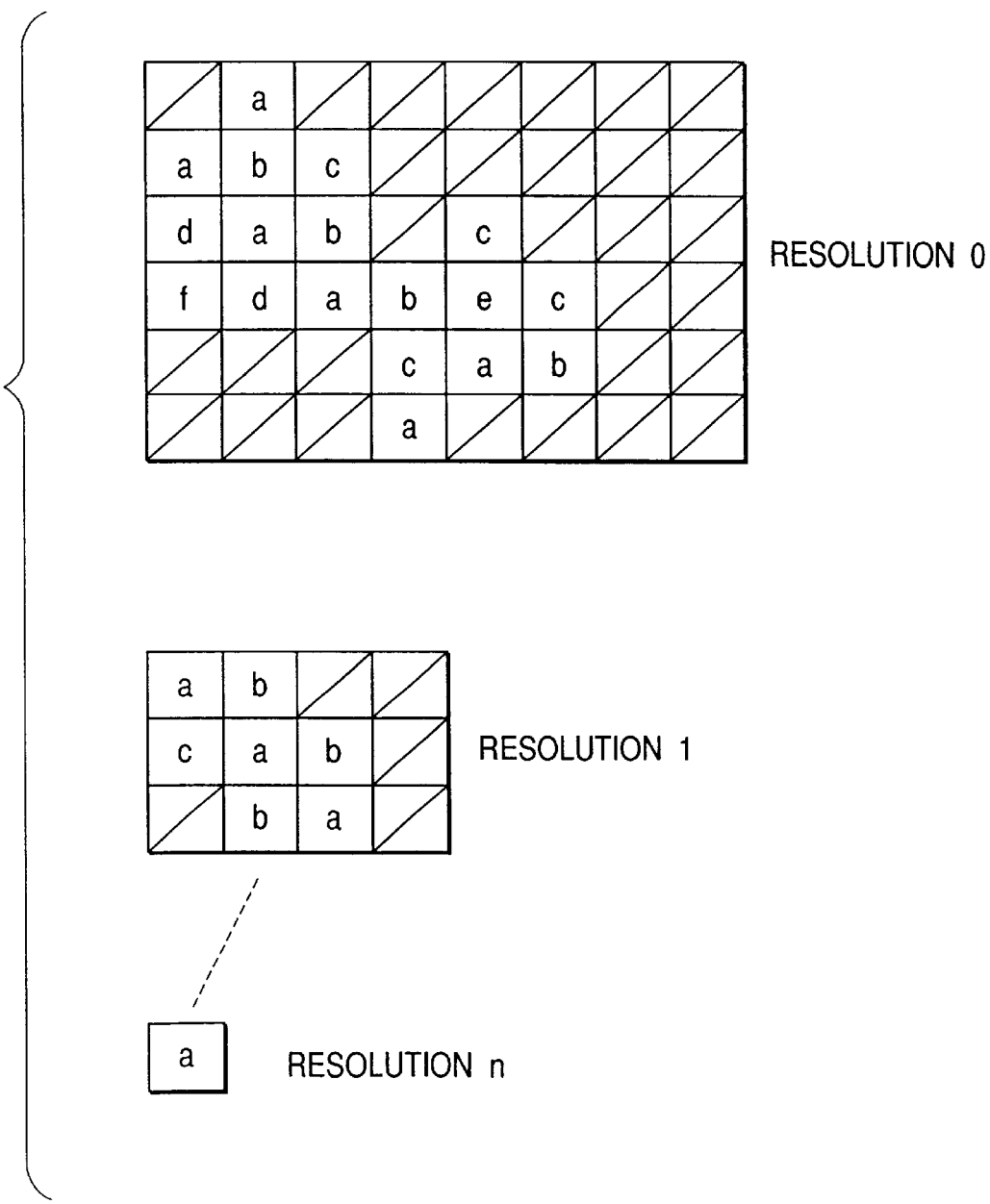

FIG. 21 shows an example of the watermark insertion as in FIG. 18.

In FIG. 21, a, b, c, d, e and f respectively indicate information to be inserted as the watermark. The content of the information a can be, among the aforementioned first to tenth attribute information, for example the name of producer of the original image and the date of preparation thereof; the content of the information b can be for example the name of the final storing person and the date and time of final storage, the content of the information c can be for example the name of the application used in the preparation; the content of the information d can be for example the keyword and the comments; the content of the information e can be for example the method of image information storage such as the compression parameters (in case of JPEG compression, quantization table data or Huffman table data such as SOI, DQT, DHT, EOI etc.); and the content of the information f can be for example the ID information of the device employed in the image input.

In the example shown in FIG. 21, the information are switched according to the tile position with the same hierarchic layer, in such a manner that same information is not present in mutually adjacent tiles. Also the kind and amount of the inserted information are made larger for the higher resolution level and smaller for the lower resolution level.

Such arrangement of switching the inserted information according to the tile position within the same hierarchic layer allows to increase the kind and the amount of the information to be inserted, for a same number of the hierarchic layers, and to obtain the information of plural kinds from the images of mutually adjacent plural tiles. Also the kind and the amount of the inserted information can be made larger for the higher resolution level.

Example 5 of Watermark Insertion

Figure 22:
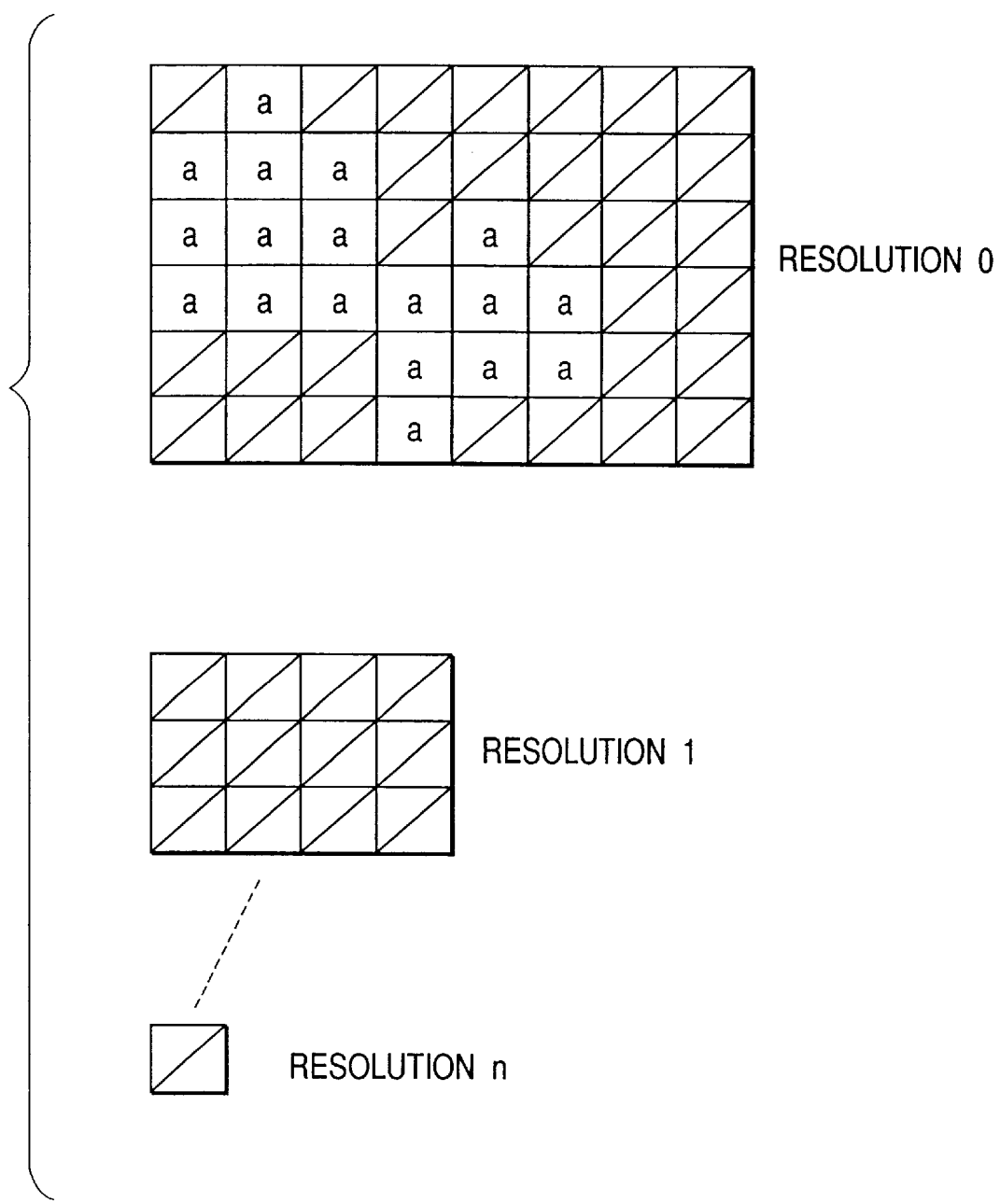

FIG. 22 shows an example of the watermark insertion as in FIG. 18, wherein a indicates information to be inserted as the watermark. The content of the information a can be, among the aforementioned first to tenth attribute information, for example the name of producer of the original image and the date of preparation thereof.

In the example shown in FIG. 22, the information a is inserted into the tiles of a specified hierarchic layer.

This example, in which the watermark is not inserted in all the layers but in a selected layer only, allows to insert the watermark in the images of the important layers, whereby the name of the producer of the original image and the preparation date hereof can be obtained from such image to securely identify the information source of the image data, while the process efficiency can be improved as the watermark insertion is not required for other images.

[Variation 1]

The foregoing embodiment employs plural watermark inserting methods, but there may be employed only one inserting method.

More specifically, all the watermarks may be inserted by the inserting method I or II. The use of a common watermark inserting method allows to simplify the software or the hardware for watermark insertion.

Also the intensity of watermark insertion may be made different in different layers, even by employing a same inserting method.

For example, the watermark inserted in the image data of a high resolution level is so formed, in the mutual calculation with the image data of the object image, that the pattern data of the watermark information assume relatively small values in order to prevent the deterioration of the image quality, and the watermark inserted in the image data of a low resolution level is so formed, in the mutual calculation with the image data of the object image, that the pattern data of the watermark information assume relatively large values in order to prevent the deterioration of the watermark information.

Such watermark inserting method, selected according to the hierarchic level of the image data, allows to insert the intensity matching the resolution level of the image data.

[Variation 2]

Also the watermark inserting method may be switched according to the resolution level.

For example, there may be employed the aforementioned inserting method I for the image of the resolution level 0, and the inserting method II for the images of other levels.

Such method allows to promptly insert the watermark with a relatively simple algorithm for the image of a high resolution level with a large data amount.

[Variation 3]

In the foregoing embodiments, the watermark is inserted in all the tiles according to the memory format of the image data, but it is also possible to insert the watermark in a part of the tiles of the object image, by periodically or randomly selecting the tiles in which the watermark is inserted.

Such arrangement allows to suppress the deterioration of the image quality resulting from the watermark insertion.

As explained in the foregoing, the embodiments of the present invention allow, in storing the image information with a predetermined image storage format, to add predetermined information to the input image with a method matching the storage format.

Figure 23:
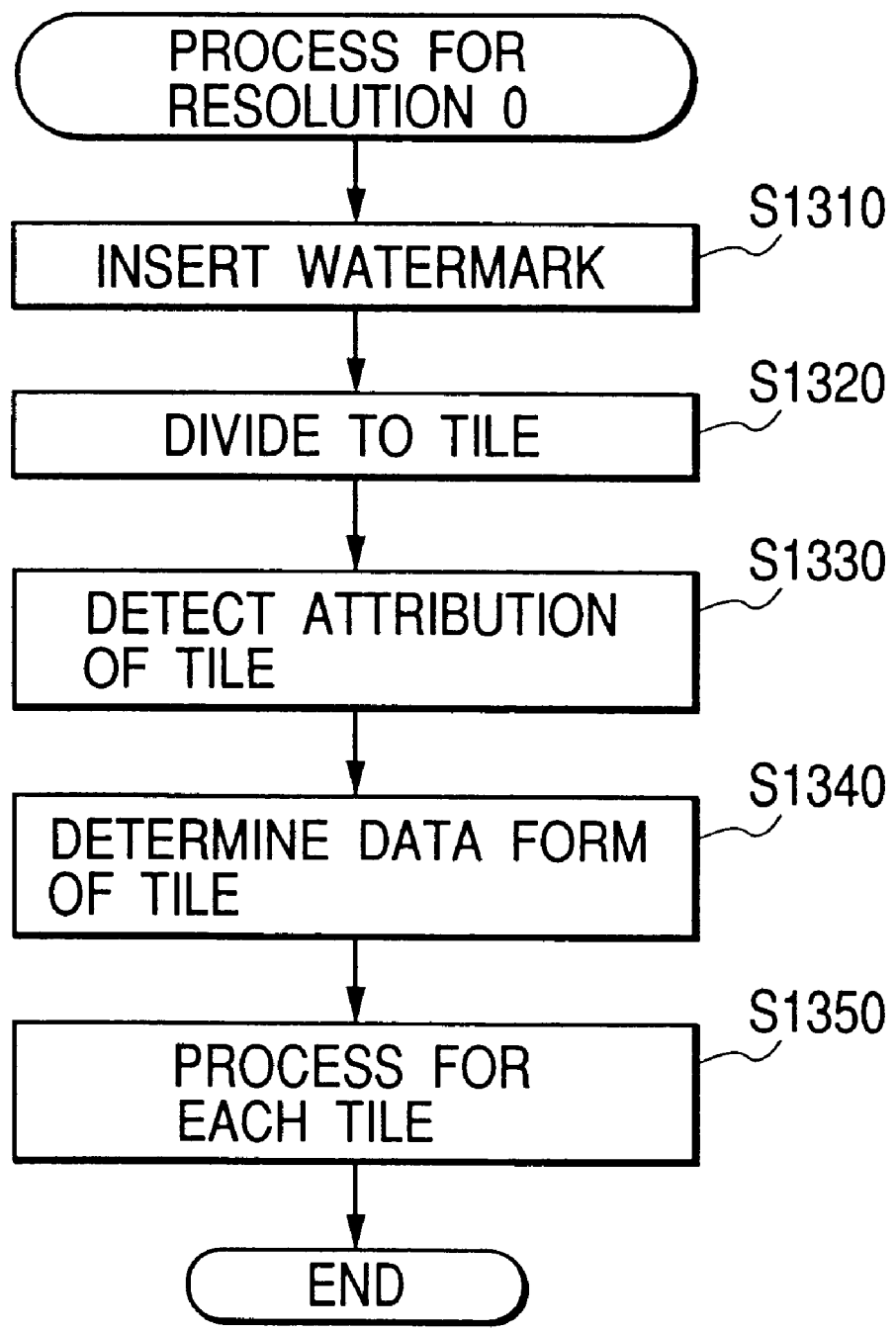
FIG. 23 is a flow chart showing the procedure of a resolution level 0 process.

In the following there will be explained still another embodiment of the present invention, which is shown in FIG. 23 as a variation of the embodiment shown in FIG. 12.

Figure 9:
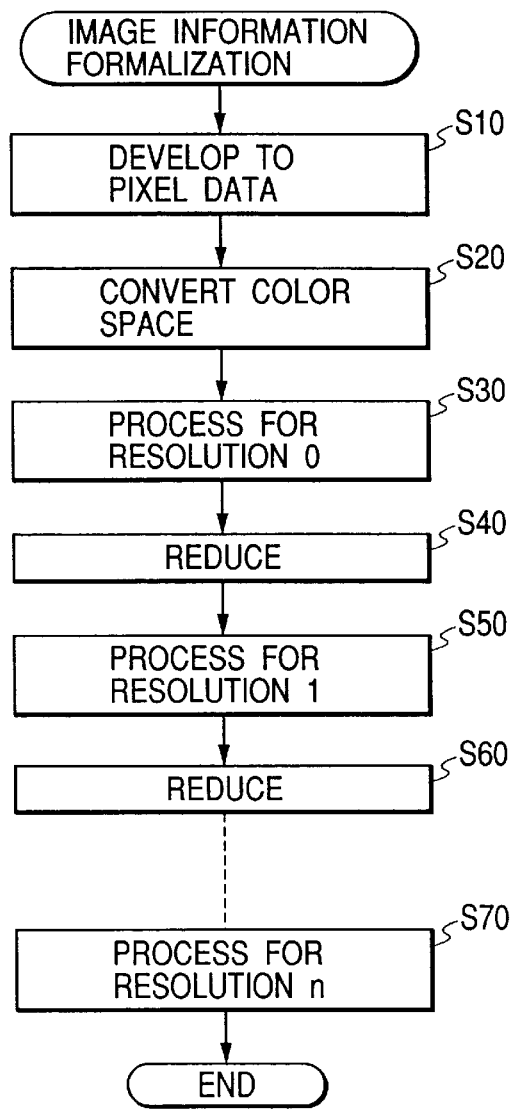
FIG. 9 is a flow chart showing the procedure of formatting of image information.
Figure 10:
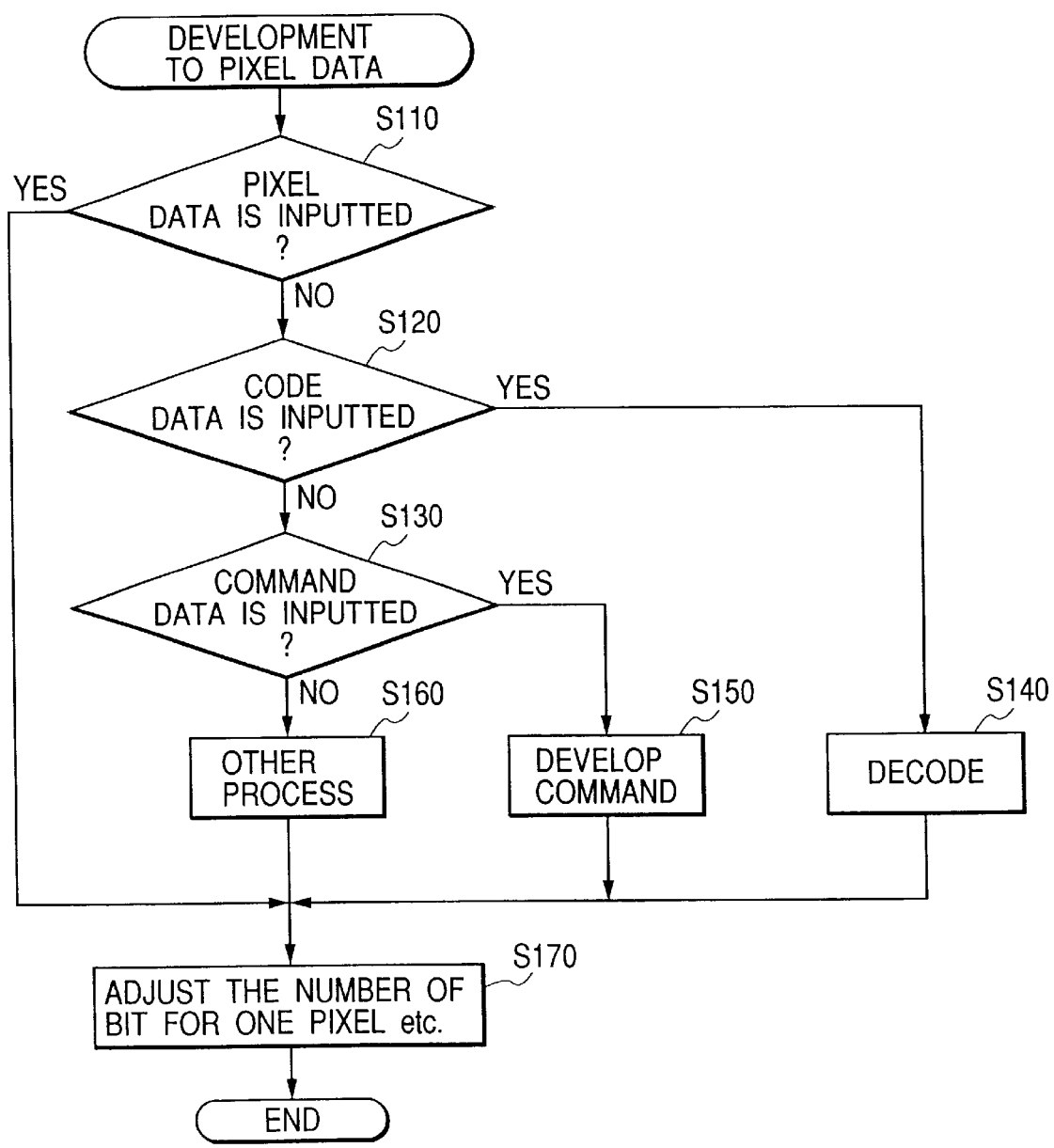
FIG. 10 is a flow chart showing the procedure of development into pixel data.

FIG. 23 shows the procedure of the present embodiment on the image of the resolution level 0 in the step S20 shown in FIG. 9.

A step S1310 inserts the watermark into the object image, in a method to be explained later.

A step S1320 divides the image into tiles, each having a size of M×N pixels.

A step S1330 detects the attribute of the image of the divided tile.

A step S1340 determines the data format according to the detected attribute.

A step S1350 processes the image data of each tile so as to assume the determined data format.

The procedure described above can also be basically applied in a similar manner to the formatting of the images of the resolution levels 1 to no.

Figure 24:
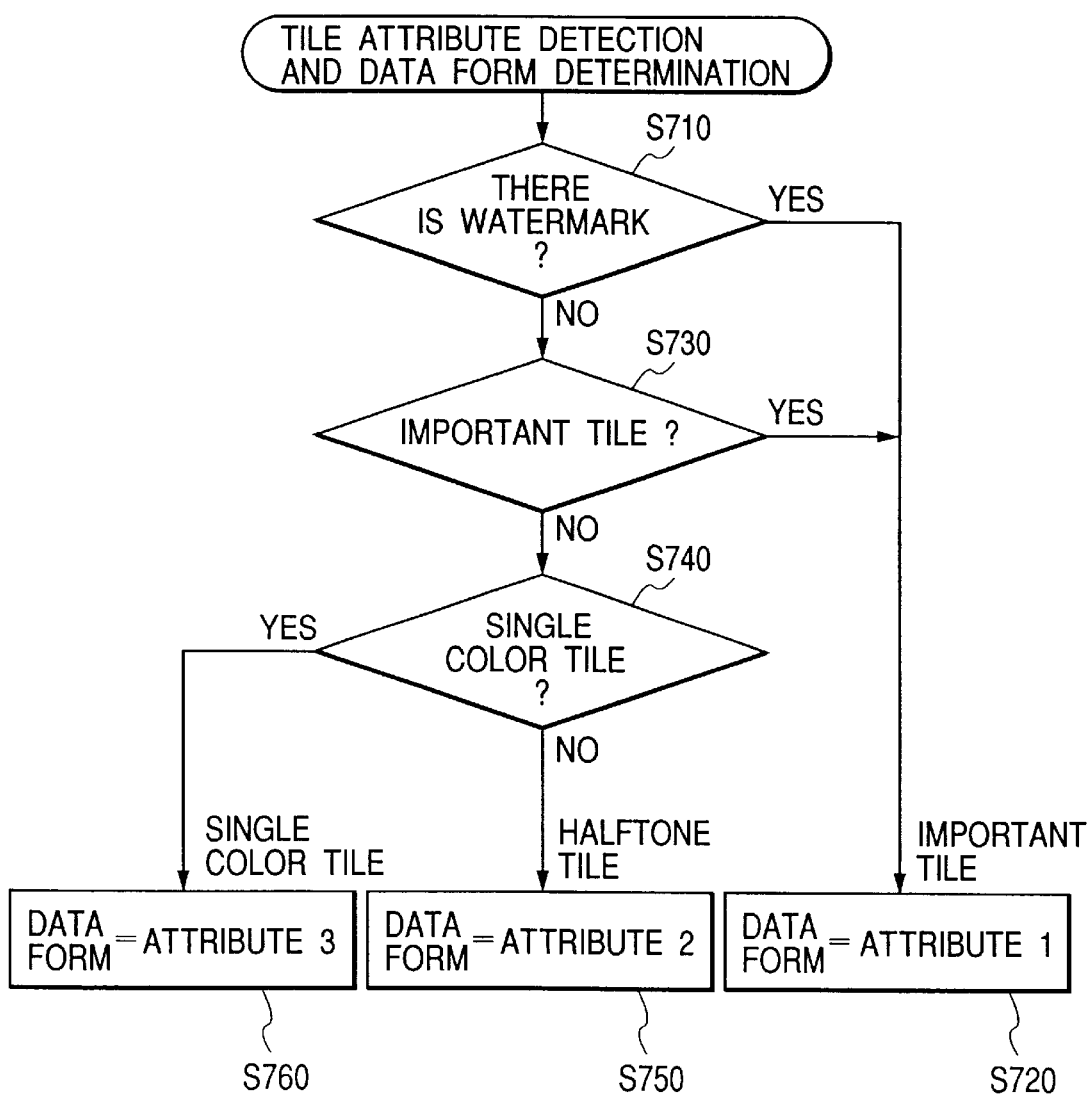
FIG. 24 is a flow chart showing the procedure of tile attribute detection and data format determination.

Now reference is made to FIG. 24 for explaining the detection of the attribute of the tile and the determination of the data format.

A step S710 discriminates whether the watermark is inserted in the tile, and, if inserted, the data format is defined as the attribute 1 (step S720).

A step S730 defines an important tile if the tile contains a character, a fine line or a relatively important information such as a human face, and the data format is defined as the non-compression attribute 1 (step S720).

A step S740 defines a single color tile if all pixels of the tile are of same data (or if only a very limited number of pixels is different in value) and the data format is defined as the single color attribute 3 (step S760). Any other tile is defined as a halftone tile, with the JPEG compression attribute 2 (step S750).

Figure 25:
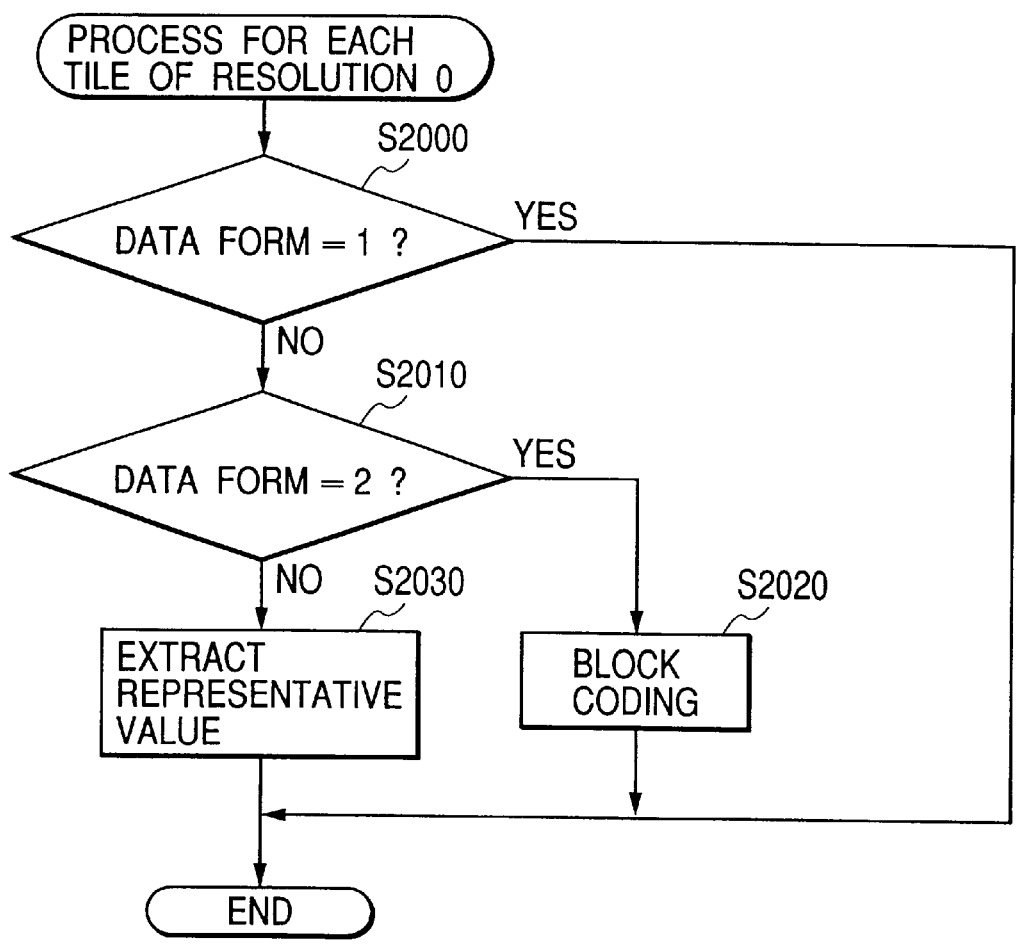
FIG. 25 is a flow chart showing the procedure of a process for each tile.

In the following there will be explained, with reference to FIG. 25, the procedure of inserting the watermark into the image data of the resolution level 0.

In the present embodiment, the process on the image data of each tile in the step S340 in FIG. 23 is conducted in the following manner to the watermark insertion.

A step S2000 discriminates whether the data format is in the attribute 1, and, if so, the process is skipped as the image data are not compressed.

A step S2010 discriminates whether the data format is in the attribute 2, and, if so, a step S2020 executes block encoding. If the block encoding employs orthogonal transformation and quantization as in the JPEG encoding, the image is deteriorated by the non-reversible encoding.

If the step S2020 identifies that the data format is not in the attribute 2, the data format is identified as in the attribute 3 and the representative value of the tile is extracted (step S2030).

The foregoing process is repeated for all the tiles.

The above-described method can also be applied to the images of the resolution levels 1 to n.

As the watermark information is added in the present embodiment in the unit of a tile of M×N pixels, the watermark information is so selected that it is accommodated in a size of M×N pixels after enciphering and pattern development.

[Variation 3]

In the foregoing embodiment the encoding is not executed on the tile in which the watermark is inserted, but it is also possible to adopt encoding in so-called lossless encoding manner which does not result in the deterioration of the image quality. More specifically, the control means for encoding is so designed as to select a predetermined encoding method in case predetermined information is added.

Also, even for a same encoding method, there may be selected such an encoding parameter as to reduce the image quality deterioration by encoding. For example the deterioration of the image quality can be suppressed by controlling the quantizing parameter. More specifically, the control means for encoding may be so designed as to select a predetermined encoding parameter in case predetermined information is added.

The present invention may be applied to a part of a system consisting of plural equipment (for example host computer, interface devices, reader, printer etc.) or a part of an apparatus consisting of a single equipment (such as a copying machine or a facsimile apparatus).

Also the present invention is not limited to the apparatus or the method for realizing the aforementioned embodiments but also includes a case where program codes of a software for realizing the aforementioned embodiments are supplied to a computer (CPU or MPU) in the above-mentioned system or apparatus and the functions of the aforementioned embodiments are realized by the computer of the above-mentioned system or apparatus, which causes various devices to function according to such program codes.

In such case the program codes themselves of the software realize the functions of the aforementioned embodiments, and such program codes themselves and means for supplying the computer with such program codes, namely a storage medium storing the program codes are also included in the present invention.

The storage medium storing such program codes can be, for example, a floppy disk, a hard disk, an optical disk, a magnetooptical disk, a CD-ROM, a magnetic tape, a nonvolatile memory card or a ROM.

The present invention also includes such program codes, not only in the case where the functions of the aforementioned embodiments are realized by the control of the above-mentioned computer on various devices according to the supplied program codes but also in a case where the program codes realize the aforementioned embodiments in cooperation with an operating system functioning on the computer or another application software.

The present invention further includes a case wherein the supplied program codes are once stored in a function expansion board of the computer or a memory provided in a function expansion unit connected to the computer, and a CPU or the like provided in the function expansion board or the function expansion unit executes all the process or a part thereof according to the instructions of such program codes, thereby realizing the functions of the aforementioned embodiments.

Though the image formats shown in FIGS. 2 to 5 are adopted in the foregoing embodiments, the present invention is not limited to such image formats but can also employ other image formats.

As explained in the foregoing, embodiments of the present invention can achieve, in adding predetermined information to the input image, image storage taking such addition of information into consideration.

What is claimed is:

1. An image processing method comprising:

a generating step, of generating first image data necessary for representing a first resolution and second image data necessary for representing a second resolution, the first resolution being lower than the second resolution, wherein said first image data and said second image data representing the same image;

a first embedding step, of embedding first kind of watermark-information in at least a part of the first image data; and a second embedding step, of embedding the first kind of watermark-information in at least a part of the second image data and embedding second kind of watermark-information in another part of the second image data, wherein, the second kind of watermark-information is not embedded in the first image data.

2. An image processing method comprising:

a generating step, of generating first image data necessary for representing a first resolution and second image data necessary for representing a second resolution, the first resolution being lower than the second resolution, wherein said first image data and said second image data representing the same image;

a dividing step, of dividing each of the first and second image data into plural tiles;

encoding step, of performing encoding in regard to each tile;

a first embedding step, of embedding first kind of watermark-information in at least a part of the tile of the first image data; and a second embedding step, of embedding the first kind of watermark-information in at least a part of the tiles of the second image data and embedding second kind of watermark-information in another part of the tiles of the second image data, wherein the second kind of watermark-information is not embedded in each tile belonging to the first image data.

3. An image processing method according to claim 2, wherein the image data representing the first resolution is the image data representing a lowest resolution.

4. An image processing method according to claim 2, further comprising:

a generating step, of generating third image data necessary for representing a third resolution, the second resolution being lower than the third resolution;

a dividing and encoding step, of dividing the third image data into plural tiles and performing encoding for the divided tiles; and a third embedding step, of embedding the first kind of watermark-information in at least a part of the tile of the third image data, embedding the second kind of watermark-information in another part of the tiles of the third image data, and embedding third kind of watermark-information in another part of the tiles of the third image data, wherein the third kind of watermark-information is not embedded in each tile belonging to the first and second image data.

5. An image processing method according to claim 2, wherein, in each of said embedding steps, control is effected such that the same kind of information is not embedded in the neighboring tiles.

6. An image processing method according to claim 2, further comprising a detecting step, of detecting an attribute in regard to each tile, wherein the watermark-information is not embedded in the tile of a part of the attributes.

7. An image processing method according to claim 2, further comprising a detecting step, of detecting an attribute in regard to each tile, wherein the watermark-information is embedded in the tile of the first attribute in a first embedding method, and the watermark-information is embedded in the tile of the second attribute in a second embedding method.

8. An image processing apparatus comprising:

a generating unit adapted to generate first image data necessary for representing a first resolution and second image data necessary for representing a second resolution, the first resolution being lower than the second resolution, wherein said first image data and said second image data representing the same image;

a first embedding unit adapted to embed first kind of watermark-information in at least a part of the tile of the first image data; and a second embedding unit adapted to embed first kind of watermark-information in at least a part of the second image data and embed second kind of watermark-information in another part of the second image data, wherein the second kind of watermark-information is not embedded in the first image data.

\* \* \* \* \*

UNITED STATES PATENT AND TRADEMARK OFFICE
CERTIFICATE OF CORRECTION

PATENT NO.    : 6,647,125 B2
DATED         : November 11, 2003
INVENTOR(S)   : Kentaro Matsumoto et al.

It is certified that error appears in the above-identified patent and that said Letters Patent is hereby corrected as shown below:

<u>Column 4,</u>
Line 47, "flush" should read -- flash --.

<u>Column 5,</u>
Line 54, "non compression." should read -- non-compression. --.

<u>Column 7,</u>
Line 39, "adjust" should read -- adjusts --.

<u>Column 8,</u>
Line 45, "an" should read -- be an --.

<u>Column 12,</u>
Line 33, "to no." should read -- and up. --.

<u>Column 14,</u>
Lines 14 and 30, "representing" should read -- represent --.

<u>Column 16,</u>
Line 4, "representing" should read -- represent --.

Signed and Sealed this

Fifteenth Day of June, 2004

JON W. DUDAS
*Acting Director of the United States Patent and Trademark Office*